US012050128B2

(12) United States Patent
Murayama et al.

(10) Patent No.: US 12,050,128 B2
(45) Date of Patent: Jul. 30, 2024

(54) SPECTROSCOPIC ANALYSIS DEVICE AND SPECTROSCOPIC ANALYSIS METHOD

(71) Applicant: YOKOGAWA ELECTRIC CORPORATION, Tokyo (JP)

(72) Inventors: Kodai Murayama, Musashino (JP); Toshiyuki Saruya, Musashino (JP); Fumie Watanabe, Musashino (JP); Risa Hara, Musashino (JP)

(73) Assignee: Yokogawa Electric Corporation, Tokyo (JP)

(*) Notice: Subject to any disclaimer, the term of this patent is extended or adjusted under 35 U.S.C. 154(b) by 286 days.

(21) Appl. No.: 17/755,550

(22) PCT Filed: Oct. 20, 2020

(86) PCT No.: PCT/JP2020/039462
§ 371 (c)(1),
(2) Date: May 2, 2022

(87) PCT Pub. No.: WO2021/095458
PCT Pub. Date: May 20, 2021

(65) Prior Publication Data
US 2022/0291040 A1   Sep. 15, 2022

(30) Foreign Application Priority Data
Nov. 11, 2019 (JP) ................. 2019-203646

(51) Int. Cl.
*G01J 3/10* (2006.01)
*G01J 3/02* (2006.01)
(Continued)

(52) U.S. Cl.
CPC ............. *G01J 3/108* (2013.01); *G01J 3/0294* (2013.01); *G01N 21/658* (2013.01); *G01J 3/28* (2013.01); *G01J 2003/2879* (2013.01)

(58) Field of Classification Search
CPC ............. G01J 3/108; G01J 3/0294; G01J 3/28; G01J 2003/2879; G01N 21/658
See application file for complete search history.

(56) References Cited

U.S. PATENT DOCUMENTS

2011/0188043 A1   8/2011   Davidov et al.

FOREIGN PATENT DOCUMENTS

JP   2001242072 A  *  9/2001  ........... G01N 21/553
JP   2003344273 A  * 12/2003  ........... G01N 21/553

OTHER PUBLICATIONS

Kehata et al., "High sensitive detection of near-infrared absorption by surface plasmon resonance", Applied Physics Letters, 2003, vol. 83, No. 11, total 4 pages.
(Continued)

*Primary Examiner* — David P Porta
*Assistant Examiner* — Fani Polyzos Boosalis
(74) *Attorney, Agent, or Firm* — RANKIN, HILL & CLARK LLP

(57) ABSTRACT

A spectroscopic analysis device (1) according to the present disclosure includes a controller (40) that acquires refractive index information on a sample (S) based on information on a first spectroscopic spectrum in a first wavelength band in which only a resonance spectrum of surface plasmon occurs within a spectroscopic spectrum, determines, based on the acquired refractive index information, an incidence angle of irradiation light (L1) irradiated by an irradiator (10) with respect to a membrane (M) such that the peak wavelength of the resonance spectrum and the peak wavelength of an absorption spectrum of the sample (S) match in a second spectroscopic spectrum in a second wavelength band in which the resonance spectrum and the absorption spectrum occur within the spectroscopic spectrum, and analyzes the state of the sample (S) from information on the second
(Continued)

spectroscopic spectrum obtained based on the determined incidence angle.

10 Claims, 8 Drawing Sheets

(51) Int. Cl.
  *G01N 21/65* (2006.01)
  *G01J 3/28* (2006.01)

(56) References Cited

OTHER PUBLICATIONS

Ikehata et al., "Surface Plasmon Resonance Near-Infrared Spectroscopy", Analytical Chemistry, American Chemical Society, 2004, vol. 76, No. 21, pp. 6461-6469.
Ikehata et al., "Quantitative Analyses of Absorption-Sensitive Surface Plasmon Resonance Near-Infrared Spectra", Applied Spectroscopy, 2006, vol. 60, No. 7, pp. 747-751.

* cited by examiner

SPECTROSCOPIC ANALYSIS DEVICE AND SPECTROSCOPIC ANALYSIS METHOD

CROSS-REFERENCE TO RELATED APPLICATION

The present application claims priority to Japanese Patent Application No. 2019-203646 filed on Nov. 11, 2019, the entire contents of which are incorporated herein by reference.

TECHNICAL FIELD

The present disclosure relates to a spectroscopic analysis device and a spectroscopic analysis method.

BACKGROUND

Technology for analyzing the state of a sample, which contains a solution or the like, based on spectroscopic methods are known.

For example, non-patent literature (NPL) 1 discloses surface plasmon resonance near-infrared spectroscopy (absorption-response near-infrared spectroscopy) to excite and resonate free electrons in a metal with light, superimpose the resonance spectrum of the surface plasmon with the absorption spectrum of the sample, and increase the apparent intensity of the absorption spectrum of the sample.

CITATION LIST

Non-patent Literature

NPL 1: Appl. Phys. Lett. 83, 2232 (2003); https://doi.org/10.1063/1.1610812

SUMMARY

Technical Problem

In such conventional absorption-response near-infrared spectroscopy, when the refractive index of the sample changes due to a change in the state of the sample, including the chemical composition or the like, the peak wavelength of the resonance spectrum of the surface plasmon changes, and the apparent intensity of the absorption spectrum of the sample is reduced. When the state of the sample changes, it is difficult to separate information about the refractive index change from information about the change in the state of the sample within the change in the spectroscopic spectrum, which includes the resonance spectrum and the absorption spectrum. It has thus been difficult to analyze the state of a sample accurately.

The present disclosure aims to provide a spectroscopic analysis device and a spectroscopic analysis method that can accurately analyze the state of a sample.

Solution to Problem

A spectroscopic analysis device according to an embodiment is a spectroscopic analysis device for analyzing a state of a sample placed on a membrane that generates surface plasmon, the spectroscopic analysis device including a controller; an irradiator configured to irradiate irradiation light on the membrane; and a detector configured to detect measurement light including information on a spectroscopic spectrum that includes a resonance spectrum of the surface plasmon and an absorption spectrum of the sample, the measurement light being based on the irradiation light irradiated by the irradiator, wherein the controller is configured to acquire refractive index information on the sample based on information on a first spectroscopic spectrum in a first wavelength band in which only the resonance spectrum occurs within the spectroscopic spectrum, determine, based on the acquired refractive index information, an incidence angle of the irradiation light irradiated by the irradiator with respect to the membrane such that a peak wavelength of the resonance spectrum and a peak wavelength of the absorption spectrum match in a second spectroscopic spectrum in a second wavelength band in which the resonance spectrum and the absorption spectrum occur within the spectroscopic spectrum, and analyze the state of the sample from information on the second spectroscopic spectrum obtained based on the determined incidence angle.

With this configuration, the spectroscopic analysis device can accurately analyze the state of the sample. For example, the controller acquires refractive index information on the sample based on information on the first spectroscopic spectrum in the first wavelength band in which only the resonance spectrum occurs. This enables the controller to correct the refractive index information by extracting only the information on the refractive index change among the absorption change and refractive index change resulting from the change in the state of the sample included in the near-infrared region. Therefore, the stability of the spectroscopic spectrum in the near-infrared region is compensated for with respect to the refractive index change, and only the information on the change in the state of the sample can be acquired accurately. For example, the controller determines the incidence angle such that the peak wavelength of the resonance spectrum and the peak wavelength of the absorption spectrum match and then acquires the information on the second spectroscopic spectrum based on the determined incidence angle. This enables the controller to increase the apparent intensity of the absorption spectrum of the sample, thereby improving the measurement sensitivity of the absorption spectrum due to the sample.

In the spectroscopic analysis device in an embodiment, the irradiator may include a first adjustment mechanism configured to adjust the incidence angle based on control by the controller, and the detector may include a second adjustment mechanism configured to adjust a light-receiving angle to detect the measurement light at an exit angle corresponding to the incidence angle based on control by the controller. With this configuration, the spectroscopic analysis device can optically adjust to an optimum incidence angle such that the peak wavelength of the resonance spectrum and the peak wavelength of the absorption spectrum match. The spectroscopic analysis device can easily adjust the incidence angle by, for example, feedback control by the controller.

In the spectroscopic analysis device in an embodiment, the irradiator may collectively irradiate the irradiation light that has the incidence angle in a predetermined range on the membrane, and the detector may include an image sensor that has an array of a plurality of pixels respectively corresponding to one incidence angle in the predetermined range and to one wavelength in the second wavelength band. This configuration can reduce the spectral analysis device in size as compared to a case in which the spectral analysis device includes the first and second adjustment mechanisms. Additionally, even when the refractive index of the sample changes, there is no need to adjust the incidence angle of the irradiation light to the optimum angle when acquiring the information on the second spectroscopic spectrum, thereby facilitating measurement.

In the spectroscopic analysis device in an embodiment, the detector may include a wavelength separation element configured to separate first measurement light that contains the information on the first spectroscopic spectrum and second measurement light that contains the information on the second spectroscopic spectrum from the measurement light, and a first detector and a second detector respectively configured to detect the first measurement light and the second measurement light separated from each other by the wavelength separation element. This enables the controller to separate the information on the first spectroscopic spectrum from the information on the second spectroscopic spectrum and process the information separately. Therefore, the controller can, for example, accurately correct the refractive index information based on the information on the first spectroscopic spectrum. The controller can, for example, accurately analyze the state of the sample based on the information of the second spectroscopic spectrum, in which the peak wavelength of the resonance spectrum is adjusted based on the corrected refractive index information.

In the spectroscopic analysis device in an embodiment, the detector may be disposed between the wavelength separation element and the first detector and may include a wavelength dispersion element for dispersing the first measurement light separated by the wavelength separation element. This enables the spectroscopic analysis device to disperse the first measurement light and acquire the information on the first spectroscopic spectrum.

In the spectroscopic analysis device in an embodiment, the wavelength dispersion element may be an etalon filter. This enables the spectroscopic analysis device to acquire the information on the first spectroscopic spectrum as information on the change in intensity of the first measurement light. Therefore, compared to a case in which the wavelength dispersion element includes a grating, for example, the spectroscopic analysis device can be reduced in size, and the product cost of the spectroscopic analysis device can be reduced.

In the spectroscopic analysis device in an embodiment, the irradiator may include a single light source configured to irradiate the irradiation light having a wavelength band that includes the first wavelength band and the second wavelength band. With this configuration, a wide band of irradiation light can be obtained easily with a single light source. Therefore, compared to the case in which the irradiator includes a plurality of light sources, for example, the spectroscopic analysis device can be reduced in size, and the product cost of the spectroscopic analysis device can be reduced.

In the spectroscopic analysis device in an embodiment, the irradiator may include a first light source configured to irradiate a first irradiation light having a wavelength band that is equal to or less than a full width at half maximum of the resonance spectrum in the first wavelength band, and a second light source configured to irradiate a second irradiation light having the second wavelength band, and the first detector may detect the first measurement light separated by the wavelength separation element while a light intensity of the first measurement light is changed based on the resonance spectrum. This enables the controller to calculate the refractive index of the sample by measuring the light intensity of the first measurement light at the first detector.

In the spectroscopic analysis device in an embodiment, the first wavelength band may be included in the visible region, and the second wavelength band may be included in the near-infrared region. By the first wavelength band being included in the visible region, the spectroscopic analysis device can acquire the refractive index information in a wavelength band in which the responsiveness of the wavelength of light to changes in the refractive index is good. Therefore, the accuracy of the refractive index information acquired by the spectroscopic analysis device improves. By the second wavelength band being included in the near-infrared region, the spectroscopic analysis device can analyze the state of the sample based on the absorption spectrum derived from molecular vibration, for example.

A spectroscopic analysis method according to an embodiment is a spectroscopic analysis method to be executed by a spectroscopic analysis device for analyzing a state of a sample placed on a membrane that generates surface plasmon, the spectroscopic analysis method including irradiating irradiation light on the membrane; detecting measurement light including information on a spectroscopic spectrum that includes a resonance spectrum of the surface plasmon and an absorption spectrum of the sample, the measurement light being based on the irradiated irradiation light; acquiring refractive index information on the sample based on information on a first spectroscopic spectrum in a first wavelength band in which only the resonance spectrum occurs within the spectroscopic spectrum; determining, based on the acquired refractive index information, an incidence angle of the irradiation light irradiated by the irradiator with respect to the membrane such that a peak wavelength of the resonance spectrum and a peak wavelength of the absorption spectrum match in a second spectroscopic spectrum in a second wavelength band in which the resonance spectrum and the absorption spectrum occur within the spectroscopic spectrum; and analyzing the state of the sample from information on the second spectroscopic spectrum obtained based on the determined incidence angle.

With this configuration, the spectroscopic analysis device can accurately analyze the state of the sample. For example, the controller of the spectroscopic analysis device acquires refractive index information on the sample based on information on the first spectroscopic spectrum in the first wavelength band in which only the resonance spectrum occurs. This enables the controller to correct the refractive index information by extracting only the information on the refractive index change among the absorption change and refractive index change resulting from the change in the state of the sample included in the near-infrared region. Therefore, the stability of the spectroscopic spectrum in the near-infrared region is compensated for with respect to the refractive index change, and only the information on the change in the state of the sample can be acquired accurately. For example, the controller determines the incidence angle such that the peak wavelength of the resonance spectrum and the peak wavelength of the absorption spectrum match and then acquires the information on the second spectroscopic spectrum based on the determined incidence angle. This enables the controller to increase the apparent intensity of the absorption spectrum of the sample, thereby improving the measurement sensitivity of the absorption spectrum due to the sample.

Advantageous Effect

According to the present disclosure, a spectroscopic analysis device and a spectroscopic analysis method that can accurately analyze the state of a sample can be provided.

DETAILED DESCRIPTION

Figure 1:
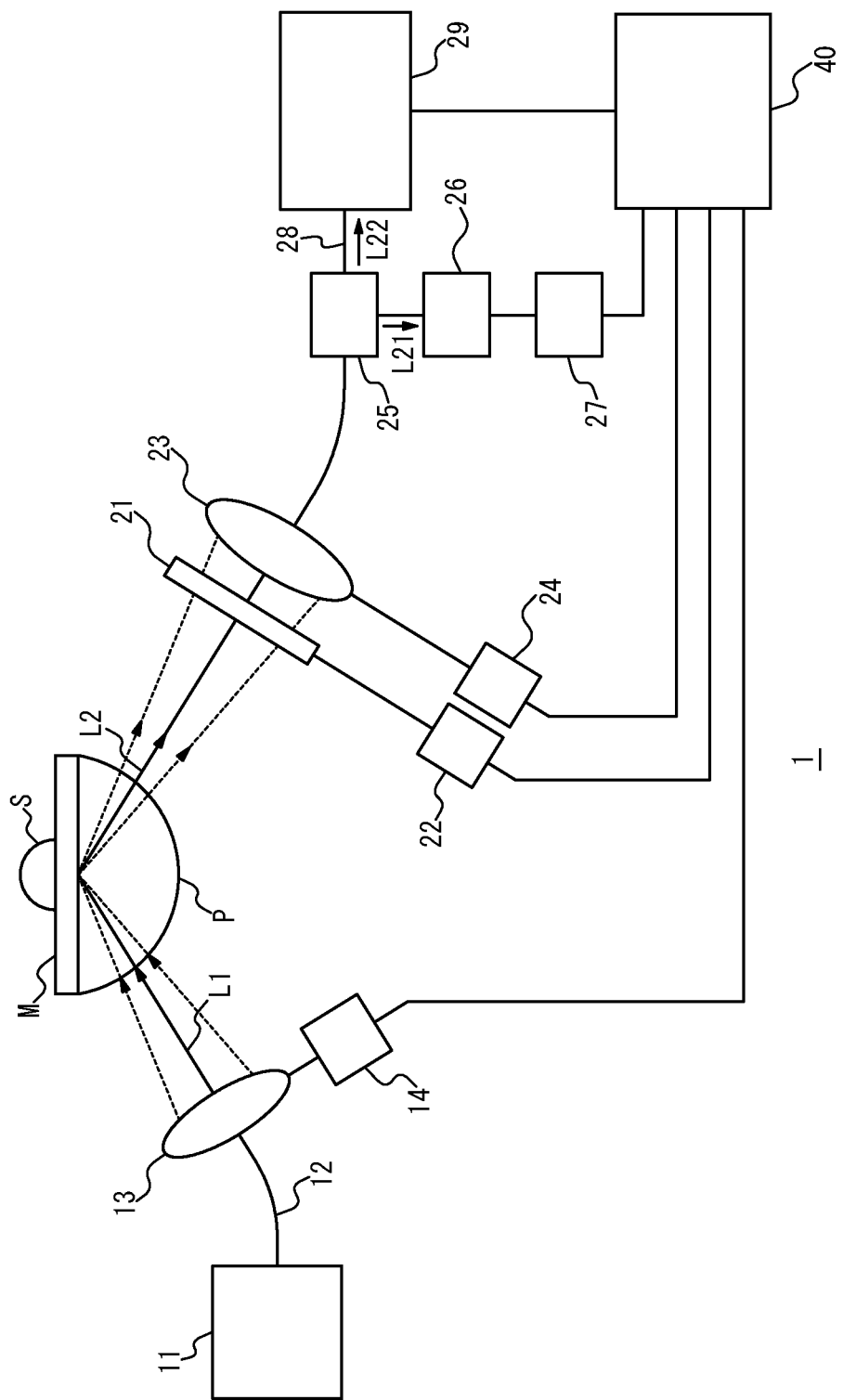
FIG. 1 schematically illustrates the configuration of a spectroscopic analysis device according to an embodiment of the present disclosure.

The background and problems with known technology are described in greater detail.

Attenuated total reflection (ATR) spectroscopy is generally known. In this method, irradiation light is irradiated from the edge of an optical prism onto a sample adhered to the prism, and emitted light from the optical prism, which is totally reflected at the critical angle or greater, is detected. In the ATR method, an evanescent wave based on the irradiation light is generated on the optical prism surface when the irradiation light undergoes total reflection. This evanescent wave is used to acquire the absorption spectrum of the sample.

However, the evanescent wave exists only on the extreme surface of the optical prism. Therefore, the irradiation light irradiated on the sample is weak, and the intensity of the absorption spectrum of the sample is low. To solve this problem, surface plasmon resonance near-infrared spectroscopy (absorption-response near-infrared spectroscopy) has been developed to excite and resonate free electrons in a metal with light, superimpose the resonance spectrum of the surface plasmon with the absorption spectrum of the sample, and increase the apparent intensity of the absorption spectrum of the sample.

In conventional optical systems used in absorption-response near-infrared spectroscopy, irradiation light irradiated from a wide band light source propagates through light-guiding components such as optical fibers, is adjusted to parallel light by lenses, mirrors, and the like, and then enters a prism substrate to which a metal membrane is bonded. The metal membrane includes a thin film of gold, silver, copper, or the like. The prism substrate includes, for example, a cylindrical prism or a hemispherical prism. For example, a lens for adjusting irradiation light to parallel light is provided with a lens rotation mechanism with the interface between the metal membrane and the prism substrate as the axial center to adjust the incidence angle of the irradiation light on the metal membrane.

The emitted light reflected by the prism substrate passes through a polarizer, which has a rotation mechanism for controlling the polarization of the emitted light, and is focused by a lens, mirror, or the like. For example, a lens for focusing the emitted light is provided with a lens rotation mechanism with the interface between the metal membrane and the prism substrate as the axial center to adjust the light receiving angle of the emitted light. The emitted light adjusted to the predetermined light receiving angle propagates through light-guiding components, such as an optical fiber, and is detected by a spectrometer. A processor acquires information on the spectroscopic spectrum based on the detected emitted light.

As described above, in conventional absorption-response near-infrared spectroscopy, the irradiation light from a wide band light source enters a prism substrate to which a metal membrane is bonded. The emitted light, which is totally reflected and emitted at the interface of the prism substrate, passes through a polarizer adjusted to cut out the polarization in the horizontal direction relative to the interface of the prism substrate or in the vertical direction relative to the interface of the prism substrate as the measurement light, and is detected by a spectrometer.

When the polarization is perpendicular to the interface of the prism substrate (p-polarization), an evanescent wave is generated. On the other hand, when the polarization is parallel to the interface of the prism substrate (s-polarization), total reflection occurs at the interface of the metal membrane, and no evanescent wave is generated. Therefore, by rotating the polarizer and switching the polarization orientation angle to 0° (s-polarization) or 90° (p-polarization), it is possible to switch between and detect measurement light that has been absorbed and measurement light that has not been absorbed. The processor can obtain the absorption spectrum of the sample by calculating the difference between the information on the two measurement lights and subtracting information on the resonance spectrum of the surface plasmon acquired by calculation or the like.

When the wavelength of the evanescent wave and the wavelength of the surface plasmon match in the total reflection conditions of an optical system in which the irradiation light enters from the back surface of the metal membrane, the evanescent wave and the surface plasmon resonate, and extreme optical absorption occurs. The resonance spectrum of the surface plasmon depends on the refractive index of the sample on the metal membrane. More specifically, the maximum absorption wavelength, i.e., the peak wavelength, of the resonance spectrum of the surface plasmon or the maximum absorption angle shifts based on the refractive index of the sample. Similarly, changing the incidence angle of the irradiation light on the metal membrane causes the peak wavelength of the resonance spectrum of the surface plasmon to change in the direction of the wavelength axis.

Therefore, it is possible to shift the peak wavelength of the resonance spectrum to a specific wavelength range so that the maximum optical absorption wavelength under resonance conditions and the peak wavelength of the absorption spectrum of the sample match. This increases the apparent intensity of the absorption spectrum of the sample, enabling highly sensitive measurement of the absorption spectrum caused by the sample.

In the above-described conventional absorption-response near-infrared spectroscopy, several problems arise in the analysis of the chemical composition of a sample, for example, due to a change in the refractive index of the sample caused by the change in the component composition. More specifically, in conventional absorption-response near-infrared spectroscopy, a problem occurs in that the peak wavelength of the resonance spectrum of the surface plasmon changes due to the refractive index change resulting from a change in the chemical composition of the sample, and the apparent intensity of the absorption spectrum of the sample is reduced. Therefore, a spectroscopic spectrum that includes the resonance spectrum and the absorption spectrum is unstable with regard to changes in the chemical composition of the sample.

When the chemical composition of the sample changes, it has been difficult to separate information about the refractive index change from information about the change in the chemical composition of the sample within the change in the spectroscopic spectrum. Therefore, it has been difficult to compensate for stability of the spectroscopic spectrum based only on the information on the refractive index change, for example, and to acquire only the information about the change in the chemical composition of the sample with high accuracy.

To resolve the above-described problems, the present disclosure aims to provide a spectroscopic analysis device and a spectroscopic analysis method that can accurately analyze the state of a sample. Embodiments of the present disclosure are mainly described below with reference to the drawings.

FIG. 1 schematically illustrates the configuration of a spectroscopic analysis device 1 according to an embodiment of the present disclosure. The spectroscopic analysis device 1 analyzes the state of a sample S placed on a metal membrane M that generates surface plasmon. In the present description, the "sample S" includes, for example, a solution. The "state of the sample S" includes, for example, the chemical composition, including the types and ratios of components in the sample S, and any other physical or chemical parameters that can be read from the absorption spectrum of the sample S. The configuration of the spectroscopic analysis device 1 according to an embodiment of the present disclosure is mainly described with reference to FIG. 1.

The spectroscopic analysis device 1 includes a single wide band light source 11 that irradiates irradiation light L1 with a wavelength range that includes the visible and near-infrared regions, a light guiding component 12 that guides the irradiation light L1 irradiated from the wide band light source 11, and an optical parallelization component 13 that adjusts the irradiation light L1 emitted from the light guiding component 12 to parallel light. The irradiation light L1 emitted from the optical parallelization component 13 is incident on a prism substrate P to which the metal membrane M is bonded. The metal membrane M includes a thin film of gold, silver, copper, or the like. The prism substrate P includes, for example, a cylindrical prism or a hemispherical prism. The sample S is arranged on the metal membrane M. The spectroscopic analysis device 1 includes a first rotation mechanism 14 (first adjustment mechanism), attached to the optical parallelization component 13, for example, to adjust the incidence angle of the irradiation light L1 on the metal membrane M. The axial center of the first rotation mechanism 14 is the interface between the metal membrane M and the prism substrate P.

The spectroscopic analysis device 1 includes a polarizer 21 provided with a second rotation mechanism 22 to control the polarization of measurement light L2 reflected on the prism substrate P and a focusing component 23 to focus the measurement light L2 emitted from the polarizer 21. The spectroscopic analysis device 1 includes a third rotation mechanism 24 (second adjustment mechanism), attached to the focusing component 23, for example, to adjust the light receiving angle of the measurement light L2. The axial center of the third rotation mechanism 24 is the interface between the metal membrane M and the prism substrate P. The spectroscopic analysis device 1 includes a wavelength separation element 25 for the visible and near-infrared regions, a wavelength dispersion element 26 for dispersing the first measurement light L21 in the visible region separated by the wavelength separation element 25, and a first detector 27 that detects the first measurement light L21 emitted from the wavelength dispersion element 26. The spectroscopic analysis device 1 includes a light guiding component 28 to guide the second measurement light L22 in the near-infrared region, separated by the wavelength separation element 25, and a second detector 29 to detect the second measurement light L22 that propagates through the light guiding component 28.

Figure 4:
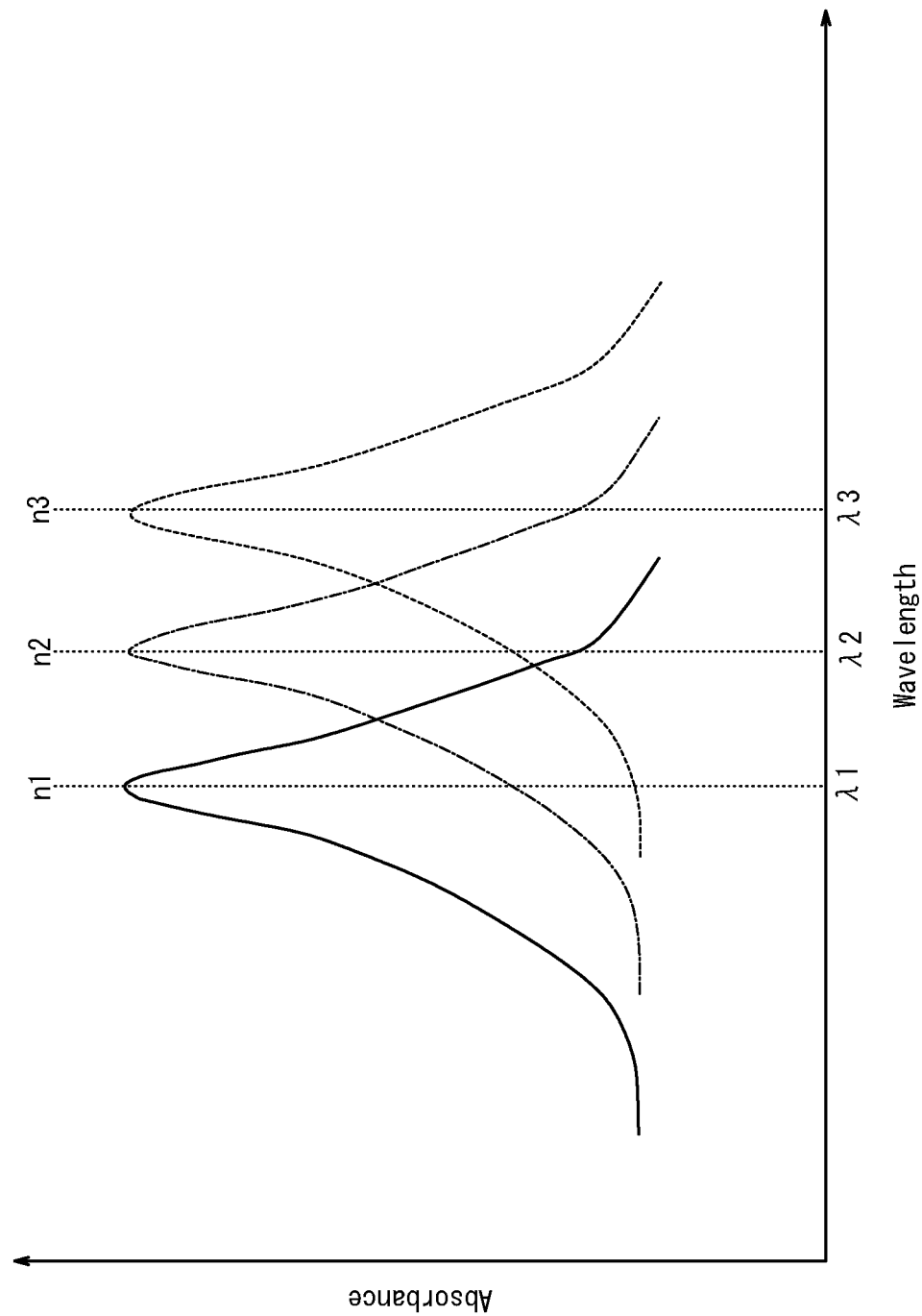
FIG. 4 is a graph illustrating an example of the resonance spectrum of surface plasmon in the visible region in a metal membrane.
Figure 6:
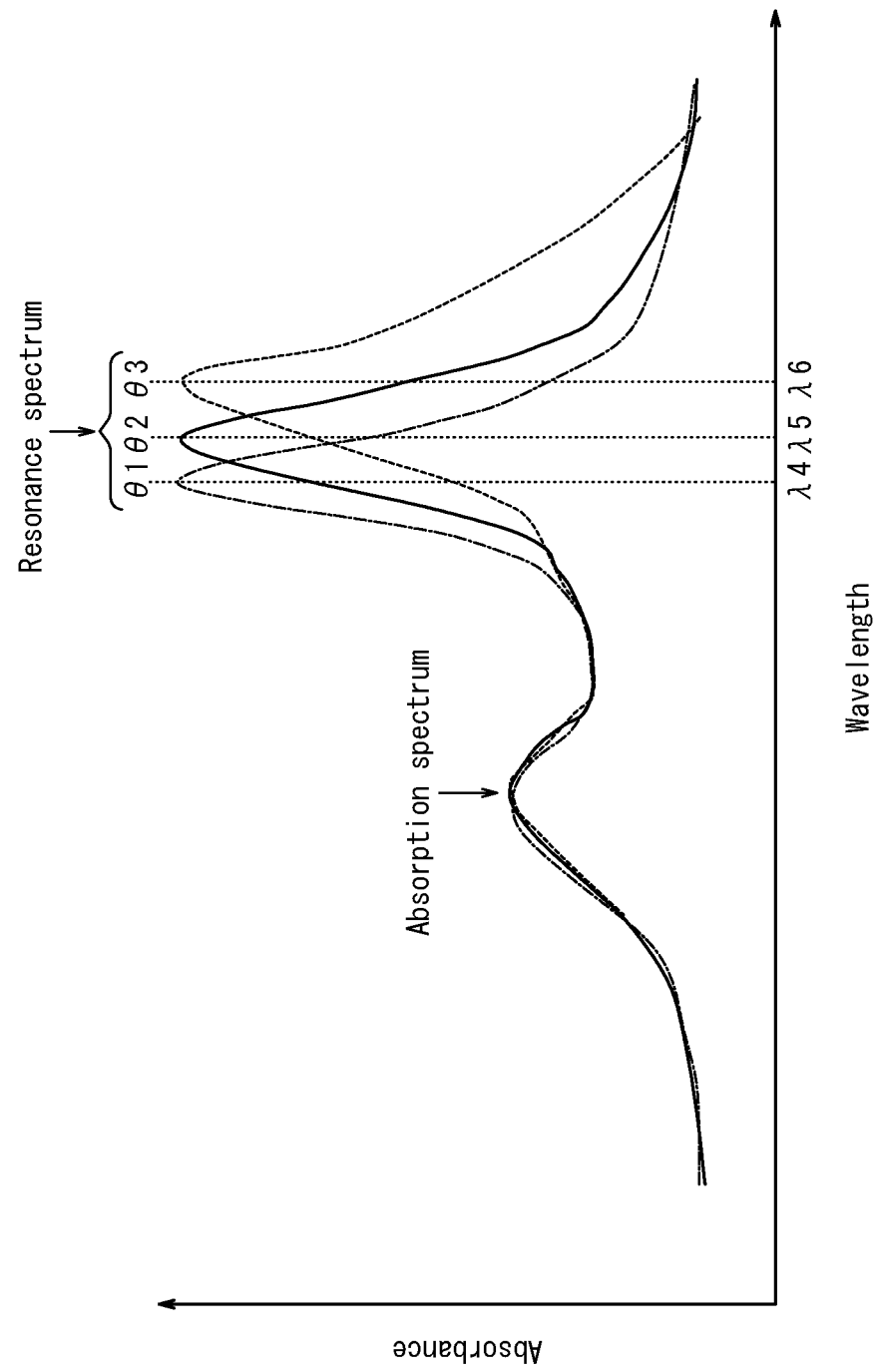
FIG. 6 is a graph illustrating an example of the resonance spectrum of surface plasmon in the near-infrared region in a metal membrane and the absorption spectrum of a sample.

The spectroscopic analysis device 1 includes a controller 40 that acquires information on the spectroscopic spectrum based on the detected measurement light L2. In the present description, the "measurement light L2" includes, for example, the first measurement light L21 and the second measurement light L22. In the present description, the "spectroscopic spectrum" includes, for example, the resonance spectrum of surface plasmon in the metal membrane M and the absorption spectrum of the sample S. In the present description, the "information on the spectroscopic spectrum" includes, for example, profile information on the entire spectroscopic spectrum acquired over a predetermined wavelength range, as illustrated in FIGS. 4 and 6, described below. This configuration is not limiting, and the "information on the spectroscopic spectrum" may, for example, include information on the light intensity of the measurement light L2 obtained by converting the profile information of the spectroscopic spectrum along the wavelength axis using an optical filter that transmits only a fixed portion of the wavelength range.

Figure 2:
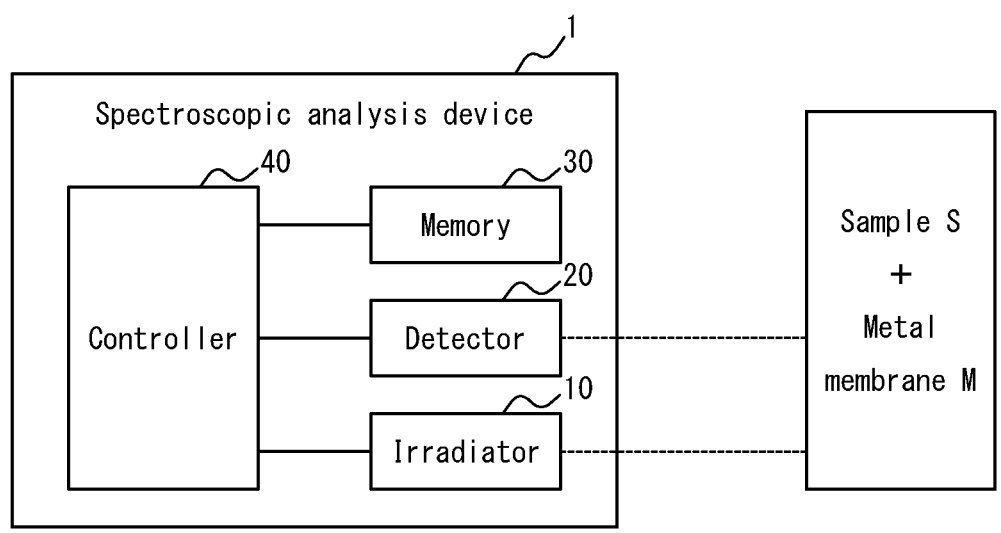
FIG. 2 is a block diagram corresponding to the schematic configuration of the spectroscopic analysis device in FIG. 1.

FIG. 2 is a block diagram corresponding to the schematic configuration of the spectroscopic analysis device 1 in FIG. 1. The configuration of the spectroscopic analysis device 1 according to an embodiment of the present disclosure is described in greater detail with reference to FIGS. 1 and 2.

The spectroscopic analysis device 1 includes an irradiator 10, a detector 20, and a memory 30 in addition to the above-described controller 40.

The irradiator 10 includes any optical system that irradiates the irradiation light L1 on the metal membrane M. For example, the irradiator 10 includes the wide band light source 11, the light guiding component 12, the optical parallelization component 13, and the first rotation mechanism 14, as described above.

The wide band light source 11 includes, for example, a single light source that irradiates the irradiation light L1, which has a wavelength range that includes the visible and near-infrared regions. The light guiding component 12 may, for example, include an optical fiber or a spatial optical component such as a lens or mirror. The optical parallelization component 13 includes, for example, a spatial optical component such as a lens or mirror. The first rotation mechanism 14 includes any mechanism that can rotate the optical parallelization component 13 with the interface between the metal membrane M and the prism substrate P as the axial center to adjust the incidence angle of the irradiation light L1 on the metal membrane M.

The detector 20 includes any optical system that detects the measurement light L2, which is based on the irradiation light L1 irradiated by the irradiator 10 and includes information on the spectroscopic spectrum. For example, the detector 20 includes the polarizer 21, the second rotation mechanism 22, the focusing component 23, the third rotation mechanism 24, the wavelength separation element 25, the wavelength dispersion element 26, the first detector 27, the light guiding component 28, and the second detector 29, as described above.

The second rotation mechanism 22 includes any mechanism that can rotate the polarizer 21 to control the polarization of the measurement light L2 reflected at the prism substrate P. The focusing component 23 includes, for example, a spatial optical component such as a lens or mirror. The third rotation mechanism 24 includes any mechanism that can rotate the focusing component 23 with the interface between the metal membrane M and the prism substrate P as the axial center to adjust the light receiving angle of the measurement light L2 on the metal membrane M. The wavelength separation element 25 includes, for example, a dichroic mirror. The wavelength dispersion element 26 includes, for example, an etalon filter. The first detector 27 includes, for example, a detector that has a visible range detection element. The light guiding component 28 may, for example, include an optical fiber or a spatial optical component such as a lens or mirror. The second detector 29 includes, for example, a spectrometer that has a near-infrared spectroscopic element and a near-infrared detection element.

The memory 30 includes any storage module, such as a hard disk drive (HDD), a solid state drive (SSD), an electrically erasable programmable read-only memory (EEPROM), a read-only memory (ROM), and a random access memory (RAM). The memory 30 may, for example, function as a main memory, an auxiliary memory, or a cache memory. The memory 30 stores any information used in operations of the spectroscopic analysis device 1. For example, the memory 30 may store information on the spectroscopic spectrum detected by the detector 20. For example, the memory 30 may store a system program, an application program, and the like. The memory 30 is not limited to being internal to the spectroscopic analysis device 1 and may be an external storage module connected through a digital input/output port, such as universal serial bus (USB).

The controller 40 includes one or more processors. The "processor" in an embodiment is a general purpose processor or a dedicated processor specialized for particular processing, but these examples are not limiting. The controller 40 is communicably connected with each component of the spectroscopic analysis device 1 and controls operations of the spectroscopic analysis device 1 overall.

Referring again to FIG. 1, the functions of the optical system in the spectroscopic analysis device 1 will mainly be described.

In the spectroscopic analysis device 1, the irradiation light L1 irradiated from the wide band light source 11 is incident on the prism substrate P, to which the metal membrane M is bonded, via the light guiding component 12 and the optical parallelization component 13. The measurement light L2, which is totally reflected at the interface of the prism substrate P and emitted, passes through the polarizer 21 adjusted to cut out polarized light that is horizontal to the interface of the prism substrate P, or polarized light that is perpendicular to the interface of the prism substrate P, and is focused by the focusing component 23. The measurement light L2 focused by the focusing component 23 is detected by the first detector 27 and the second detector 29.

When the polarization is perpendicular to the interface of the prism substrate P (p-polarization), an evanescent wave is generated. On the other hand, when the polarization is parallel to the interface of the prism substrate P (s-polarization), total reflection occurs at the interface of the metal membrane M, and no evanescent wave is generated. Therefore, by rotating the polarizer 21 and switching the polarization orientation angle to 0° (s-polarization) or 90° (p-polarization), it is possible to switch between and detect measurement light L2 that has been absorbed and measurement light L2 that has not been absorbed. The controller 40 processor can obtain the absorption spectrum of the sample by calculating the difference between the information on the two measurement lights L2 and subtracting information on the resonance spectrum of the surface plasmon acquired by calculation or the like.

When the wavelength of the evanescent wave and the wavelength of the surface plasmon match in the total reflection conditions of an optical system in which the irradiation light L1 enters from the back surface of the metal membrane M, the evanescent wave and the surface plasmon resonate, and extreme optical absorption occurs. The resonance spectrum of the surface plasmon depends on the refractive index of the sample S on the metal membrane M. More specifically, the maximum absorption wavelength, i.e., the peak wavelength, of the resonance spectrum of the surface plasmon or the maximum absorption angle shifts based on the refractive index of the sample S. Similarly, changing the incidence angle of the irradiation light L1 on the metal membrane M causes the peak wavelength of the resonance spectrum of the surface plasmon to change in the direction of the wavelength axis.

Therefore, it is possible to shift the peak wavelength of the resonance spectrum to a specific wavelength range so that the maximum optical absorption wavelength under resonance conditions and the peak wavelength of the absorption spectrum of the sample S match. This increases the apparent intensity of the absorption spectrum of the sample S, and the measurement sensitivity of the absorption spectrum caused by the sample S improves.

In the spectroscopic analysis device 1, the measurement light L2 focused by the focusing component 23 is separated by the wavelength separation element 25 into first measurement light L21 containing information on the first spectroscopic spectrum and second measurement light L22 containing information on the second spectroscopic spectrum.

In the present description, the "first spectroscopic spectrum" includes, for example, the spectrum in the first wavelength band in which only the resonance spectrum of surface plasmon in the metal membrane M occurs within the spectroscopic spectrum. In the present description, the "first wavelength band" is, for example, included in the visible region. In the present description, the "visible region" includes, for example, the wavelength region of light from 400 nm to less than 800 nm. For example, the sample S does not contain any information about the complex refractive index, i.e., absorption, in the visible region, and does not exhibit any absorption spectrum.

In the present description, the "second spectroscopic spectrum" includes, for example, the spectrum in the second wavelength band in which the resonance spectrum of surface plasmon in the metal membrane M and the absorption spectrum of the sample S occur within the spectroscopic spectrum. In the present description, the "second wavelength band" is, for example, included in the near-infrared region. In the present description, the "near-infrared region" includes, for example, the wavelength region of light from 800 nm to less than 2.5 µm.

The first measurement light L21, separated by the wavelength separation element 25, in the visible region is incident on the wavelength dispersion element 26 and then is detected by the visible range detection element in the first detector 27. The controller 40 acquires information on the first spectroscopic spectrum based on detection information outputted from the first detector 27.

Figure 3:
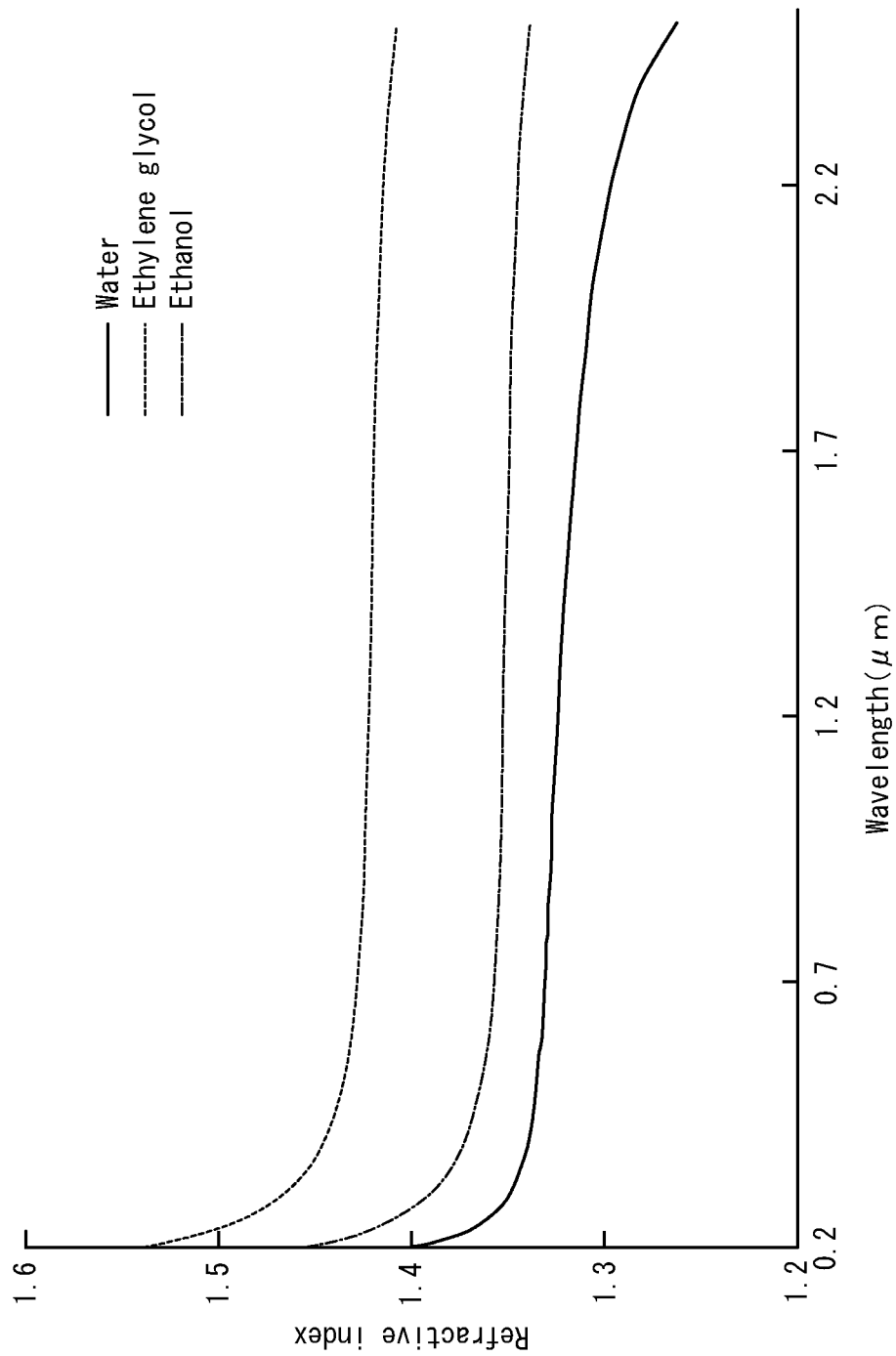
FIG. 3 is a graph illustrating an example of refractive index wavelength dispersion of materials.

FIG. 3 is a graph illustrating an example of refractive index wavelength dispersion of materials. FIG. 3 illustrates refractive index wavelength dispersion for three substances, i.e., water, ethylene glycol, and ethanol, with the vertical axis representing the refractive index, and the horizontal axis representing the wavelength.

As illustrated in FIG. 3, in the refractive index wavelength dispersion of a material, the change in refractive index dispersion is typically larger in the visible region than in the near-infrared region. Therefore, the responsiveness of light wavelength to refractive index change is good in the visible region.

FIG. 4 is a graph illustrating an example of the resonance spectrum of surface plasmon in the visible region in the metal membrane M. FIG. 4 illustrates how the peak wavelengths of the resonance spectrum in the visible region of the surface plasmon in the metal membrane M shift along the wavelength axis to $\lambda 1$, $\lambda 2$, and $\lambda 3$ as the refractive index of the sample S changes to n1, n2, and n3. The information on the first spectroscopic spectrum is stored in the memory 30, for example, as the information on the resonance spectrum of the surface plasmon reflecting the refractive index change of the sample S.

For example, if the refractive index of the sample S changes due to changes in the chemical composition of the sample S, changes in temperature or pressure, or the like, the peak wavelength of the resonance spectrum in the visible region of the surface plasmon in the metal membrane M changes as illustrated in FIG. 4. The controller 40 acquires the refractive index information on the sample S based on such information on the first spectroscopic spectrum. In the present description, the "refractive index information" includes, for example, the difference between the value of the refractive index and the value of the refractive index resulting from the refractive index change.

Figure 5:
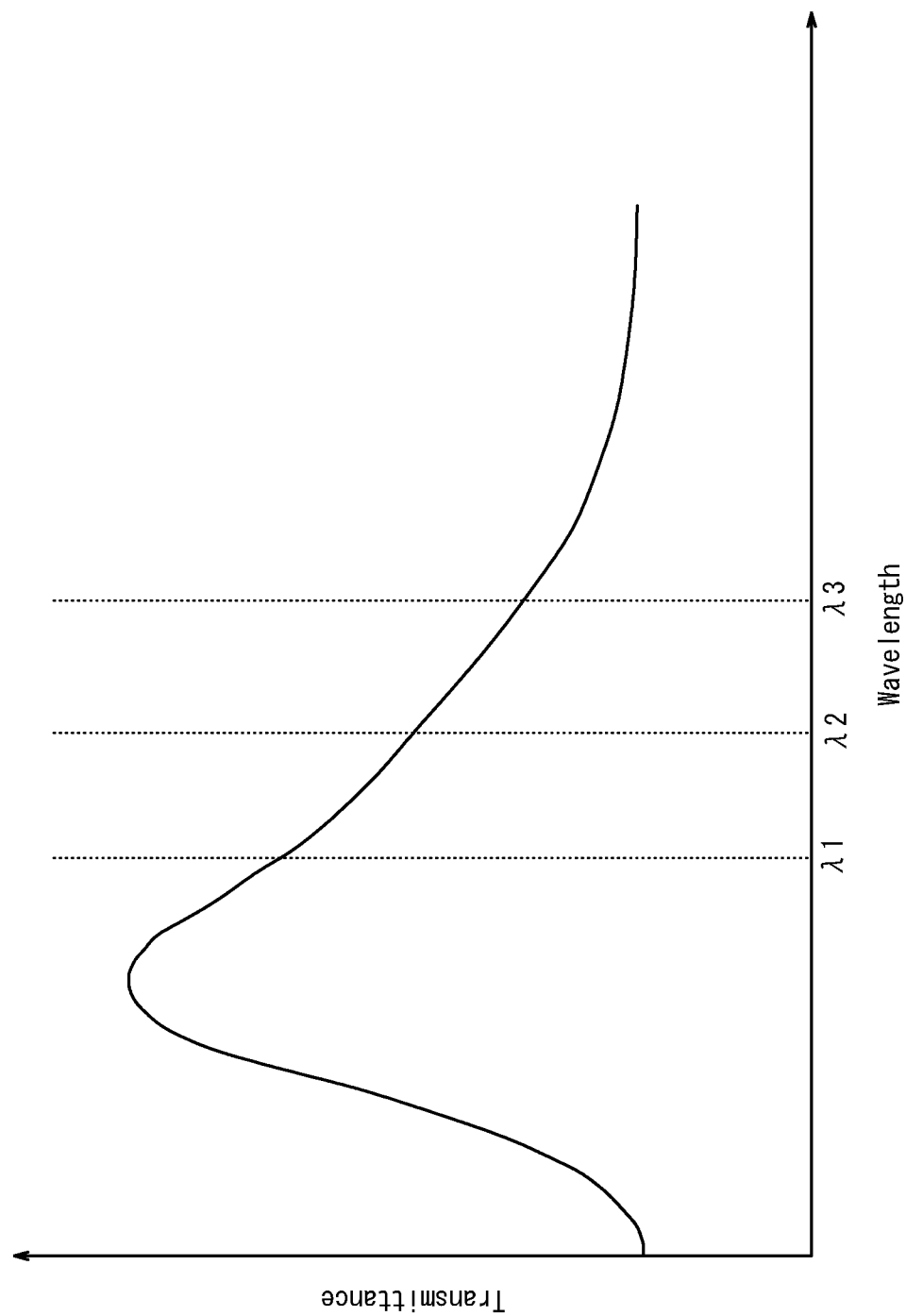
FIG. 5 is a graph illustrating an example of the wavelength characteristics of an etalon filter included in a wavelength dispersion element.

FIG. 5 is a graph illustrating an example of the wavelength characteristics of an etalon filter included in the wavelength dispersion element 26. As illustrated in FIG. 5, the etalon filter included in the wavelength dispersion element 26 has wavelength characteristics such that, for example, the peak wavelength of transmittance is located at a lower wavelength than $\lambda 1$, and the base of the profile at a higher wavelength than the peak wavelength extends from $\lambda 1$ to $\lambda 3$.

For example, if the refractive index of the sample S changes to n1, n2, and n3, and the peak wavelengths of the resonance spectrum in the visible region of the surface plasmon in the metal membrane M respectively change to $\lambda 1$, $\lambda 2$, and $\lambda 3$, then the intensity of the first measurement light L21 changes based on absorption by the surface plasmon and transmission by the etalon filter. The controller 40 acquires the refractive index information on the sample S based on the information on the first spectroscopic spectrum in the form of such information on the intensity change of the first measurement light L21. More specifically, the controller 40 calculates the light intensity of the first measurement light L21 from the detection information outputted from the first detector 27 and calculates the post-change refractive index of the sample S based on the calculated light intensity of the first measurement light L21.

The second measurement light L22 in the near-infrared region separated by the wavelength separation element 25 is, for example, detected in the second detector 29 by a spectrometer that has a near-infrared spectroscopic element and a near-infrared detection element. The controller 40 acquires information on the second spectroscopic spectrum based on detection information outputted from the second detector 29.

FIG. 6 is a graph illustrating an example of the resonance spectrum of surface plasmon in the near-infrared region in the metal membrane M and the absorption spectrum of the sample S. FIG. 6 illustrates how, for example, the peak wavelengths of the resonance spectrum in the near-infrared region and the peak wavelengths of the absorption spectrum are different from each other due to a change in the refractive index of the sample S. In this way, the information on the second spectroscopic spectrum is stored in the memory 30, for example, as a combination of the information on the resonance spectrum of the surface plasmon reflecting the change in the refractive index of the sample S and information about the complex refractive index, i.e., absorption, of the material.

Based on the refractive index information on the sample S acquired from the information on the first spectroscopic spectrum, the controller 40 determines the incidence angle of the irradiation light L1, irradiated by the irradiator 10, on the metal membrane M so that the peak wavelength of the resonance spectrum and the peak wavelength of the absorption spectrum match each other in the second spectroscopic spectrum. For example, based on the refractive index of the sample S calculated from the resonance spectrum of the surface plasmon in the visible region, the controller 40 calculates the resonance condition in the near infrared region, i.e., the incidence angle such that the peak wavelength of the resonance spectrum and the peak wavelength of the absorption spectrum match. At this time, the peak wavelength of the absorption spectrum of the sample S to which the peak wavelength of the resonance spectrum is to be matched is known. Therefore, the controller 40 calculates the incidence angle that becomes the resonance condition in the near infrared region based on the refractive index of the sample S and the peak wavelength of the absorption spectrum.

The controller 40 analyzes the state of the sample S from the information on the second spectroscopic spectrum obtained based on the determined incidence angle. At this time, based on the incidence angle that becomes the obtained resonance condition, the controller 40 performs feedback control, i.e., angle control, on the first rotation mechanism 14 and the third rotation mechanism 24 to match the resonance condition in the near infrared region. More specifically, the controller 40 controls the first rotation mechanism 14 of the irradiator 10 to match the determined incidence angle. The controller 40 controls the third rotation mechanism 24 of the detector 20 to adjust the light receiving angle for detecting the second measurement light L22 at an exit angle corresponding to the determined incidence angle.

For example, by changing the incidence angle of the irradiation light L1, the controller 40 can, in the wavelength region, adjust the peak wavelength of the resonance spectrum in the near-infrared region of the surface plasmon, as also illustrated in FIG. 6. For example, as the incidence angle of the irradiation light L1 changes to $\theta 1$, $\theta 2$, and $\theta 3$, the peak wavelength of the resonance spectrum in the near-infrared region of the surface plasmon in the metal membrane M shifts to $\lambda 4$, $\lambda 5$, and $\lambda 6$, respectively, along the wavelength axis. The controller 40 can increase the apparent intensity of the absorption spectrum of the sample S by matching the peak wavelength of the resonance spectrum and the peak wavelength of the absorption spectrum with each other.

Figure 7:
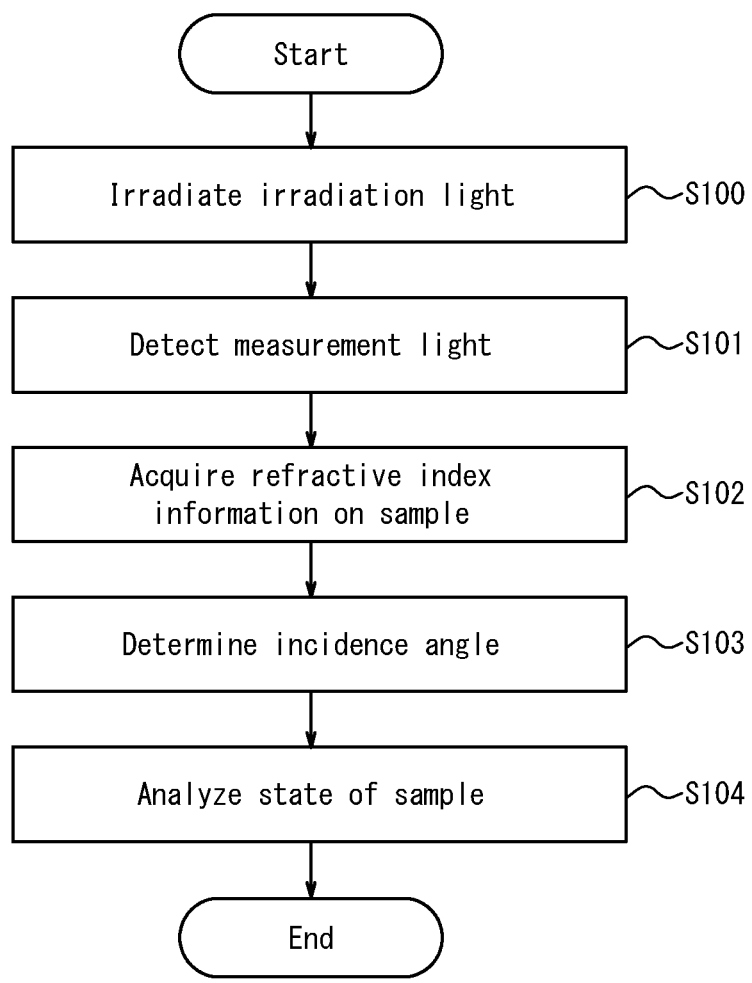
FIG. 7 is a flowchart illustrating an example of operations of the spectroscopic analysis device in FIG. 1.

FIG. 7 is a flowchart illustrating an example of operations of the spectroscopic analysis device 1 in FIG. 1. With reference to FIG. 7, an example of operations of the spectroscopic analysis device 1 is mainly described.

In step S100, the controller 40 uses the irradiator 10 to irradiate the irradiation light L1 on the metal membrane M.

In step S101, the controller 40 uses the detector 20 to detect the measurement light L2 including information on the spectroscopic spectrum that includes the resonance spectrum of the surface plasmon and the absorption spectrum of the sample S, the measurement light L2 being based on the irradiation light L1 irradiated by the irradiator 10 in step S100.

In step S102, the controller 40 acquires the refractive index information on the sample S based on the information on the first spectroscopic spectrum in the first wavelength band in which only the resonance spectrum occurs within the spectroscopic spectrum that the measurement light L2, detected in step S101, has as information.

In step S103, the controller 40 determines, based on the refractive index information acquired in step S102, an incidence angle of the irradiated irradiation light L1 with respect to the metal membrane M such that the peak wavelength of the resonance spectrum and the peak wavelength of the absorption spectrum match in the second spectroscopic spectrum in the second wavelength band in which the resonance spectrum and the absorption spectrum occur within the spectroscopic spectrum that the measurement light L2, detected in step S101, has as information.

In step S104, the controller 40 analyzes the state of the sample S from the information on the second spectroscopic spectrum obtained based on the incidence angle determined in step S103.

According to the spectroscopic analysis device 1 of the above embodiment, the state of the sample S can be accurately analyzed. For example, the controller 40 acquires the refractive index information on the sample S based on the information on the first spectroscopic spectrum in the first wavelength band in which only the resonance spectrum occurs. This enables the controller 40 to correct the refractive index information by extracting only the information on the refractive index change among the absorption change and refractive index change resulting from the change in the state of the sample S included in the near-infrared region. Therefore, the stability of the spectroscopic spectrum in the near-infrared region is compensated for with respect to the refractive index change, and only the information on the change in the state of the sample S can be acquired accurately. For example, the controller 40 determines the incidence angle such that the peak wavelength of the resonance spectrum and the peak wavelength of the absorption spectrum match and then acquires the information on the second spectroscopic spectrum based on the determined incidence angle. This enables the controller 40 to increase the apparent intensity of the absorption spectrum of the sample S, thereby improving the measurement sensitivity of the absorption spectrum due to the sample S.

For example, by including the first rotation mechanism 14 and the third rotation mechanism 24, the spectroscopic analysis device 1 can optically adjust to an optimum incidence angle such that the peak wavelength of the resonance spectrum and the peak wavelength of the absorption spectrum match. The spectroscopic analysis device 1 can easily adjust the incidence angle by, for example, feedback control by the controller 40.

For example, the same optical system illustrated in FIG. 1, which includes the first rotation mechanism 14 and the third rotation mechanism 24 and can simultaneously measure the first spectroscopic spectrum in the visible region and the second spectroscopic spectrum in the near-infrared region, maintains the simultaneity between the correction of the refractive index information, i.e., the correction of the incidence angle of the irradiation light L1, and the information on the change in the state of the sample S. Therefore, in the second spectroscopic spectrum in the near-infrared region, the peak wavelength of the resonance spectrum can be adjusted accurately based on the correction of the refractive index information that corresponds precisely in time.

For example, according to the coaxial optical system illustrated in FIG. 1, which includes the first rotation mechanism 14 and the third rotation mechanism 24, spatial variation in the measurement position on the sample S can be suppressed, and the identity of the measurement position on the sample S can be maintained. This enables the spectroscopic analysis device 1 to correct the refractive index information for the acquired first and second spectroscopic spectra while guaranteeing the identity of the measurement position on the sample S.

As a result of the detector 20 including the wavelength separation element 25, the first detector 27, and the second detector 29, the controller 40 can separate the information on the first spectroscopic spectrum from the information on the second spectroscopic spectrum and process the information separately. Therefore, the controller 40 can, for example, accurately correct the refractive index information based on the information on the first spectroscopic spectrum. The controller 40 can, for example, accurately analyze the state of the sample S based on the information of the second spectroscopic spectrum, in which the peak wavelength of the resonance spectrum is adjusted based on the corrected refractive index information.

As a result of the detector 20 including the wavelength dispersion element 26, the spectroscopic analysis device 1 can disperse the first measurement light L21 and acquire the information on the first spectroscopic spectrum. For example, as a result of the wavelength dispersion element 26 including an etalon filter, the spectroscopic analysis device 1 can obtain the information on the first spectroscopic spectrum as information on the intensity change of the first measurement light L21. Consequently, compared to a case in which the wavelength dispersion element 26 includes a grating, for example, the spectroscopic analysis device 1 can be reduced in size, and the product cost of the spectroscopic analysis device 1 can be reduced.

The irradiator 10 includes a single light source that irradiates irradiation light L1 having a wavelength band that includes the first and second wavelength bands. A wide band of irradiation light L1 can thus be easily obtained with a single light source. Therefore, compared to the case in which the irradiator 10 includes a plurality of light sources, for example, the spectroscopic analysis device 1 can be reduced in size, and the product cost of the spectroscopic analysis device 1 can be reduced.

By the first wavelength band being included in the visible region, the spectroscopic analysis device 1 can acquire the refractive index information in a wavelength band in which the responsiveness of the wavelength of light to changes in the refractive index is good. Therefore, the accuracy of the refractive index information acquired by the spectroscopic analysis device 1 improves. By the second wavelength band being included in the near-infrared region, the spectroscopic analysis device 1 can analyze the state of the sample S based on the absorption spectrum derived from molecular vibration, for example.

Although the present disclosure is based on embodiments and drawings, it is to be noted that various changes and modifications will be apparent to those skilled in the art based on the present disclosure. Therefore, such changes and modifications are to be understood as included within the scope of the present disclosure. For example, the shape, arrangement, orientation, and number of the above-described configurations are not limited to the above explanation or the drawings. The shape, arrangement, orientation, and number of each configuration may be selected freely as long as the functions of the component can be achieved. For example, the functions and the like included in the various configurations and steps may be reordered in any logically consistent way. Furthermore, configurations or steps may be combined into one or divided.

For example, the present disclosure may also be embodied as a program containing a description of the processing for achieving the functions of the above-described spectroscopic analysis device 1 or a storage medium with the program recorded thereon. Such embodiments are also to be understood as falling within the scope of the present disclosure.

Figure 8:
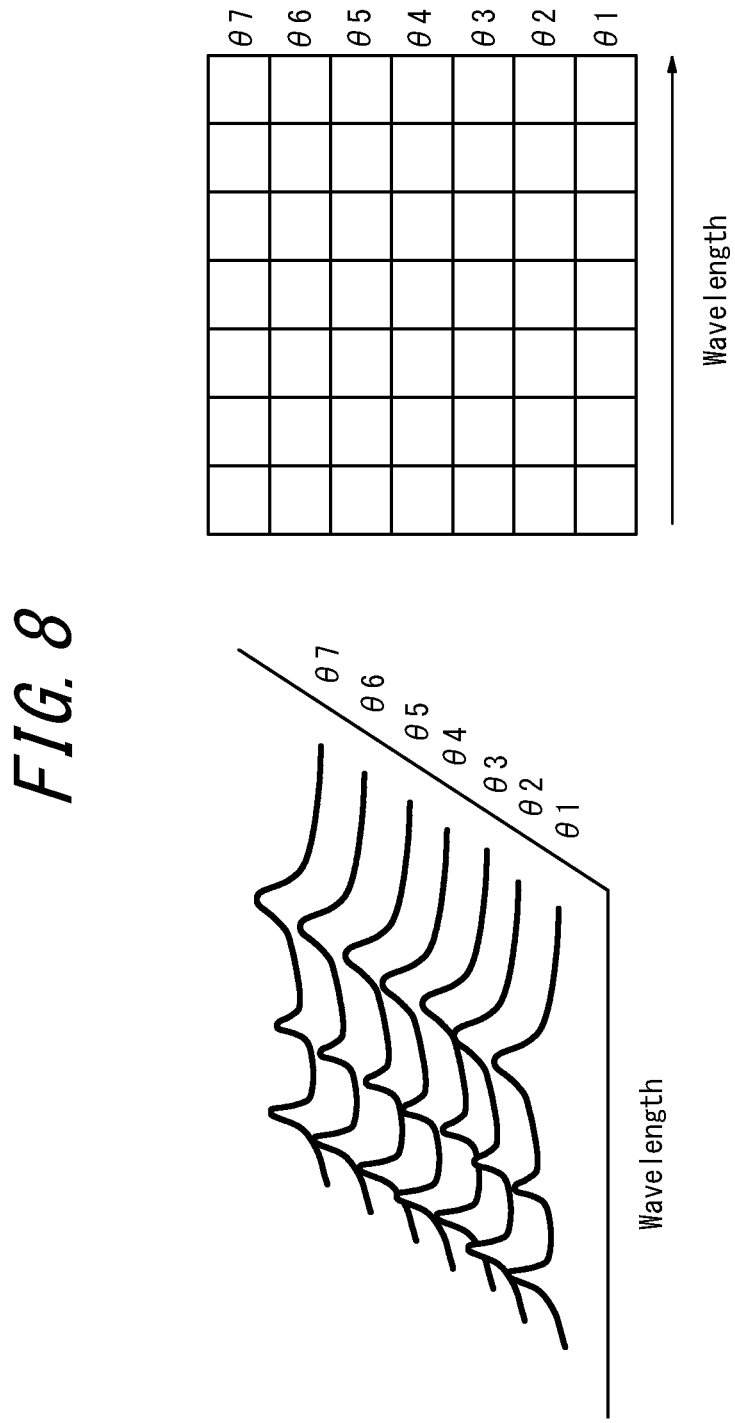
FIG. 8 is a schematic diagram illustrating a variation of the spectroscopic analysis device in FIG. 1.

FIG. 8 is a schematic diagram illustrating a variation of the spectroscopic analysis device 1 in FIG. 1. With reference to FIG. 8, the variation of the spectroscopic analysis device 1 is mainly described. FIG. 8 illustrates the second spectroscopic spectrum changing depending on the incidence angles θ1, θ2, θ3, θ4, θ5, θ6, and θ7 of the irradiation light L1, and the allocation of the incidence angle and wavelength to each pixel of the image sensor included in the second detector 29.

The spectroscopic analysis device 1 has been described as including the first rotation mechanism 14 and the third rotation mechanism 24, adjusting the incidence angle of the irradiation light L1 and the light receiving angle of the measurement light L2, and measuring with the detector 20 based on the combination of the incidence angle and the light receiving angle, but this configuration is not limiting. The spectroscopic analysis device 1 need not include the first rotation mechanism 14 and the third rotation mechanism 24.

At this time, the irradiator 10 may collectively irradiate the irradiation light L1 having an incidence angle in a predetermined range on the metal membrane M. The detector 20, more specifically the second detector 29, may include an image sensor that has an array of a plurality of pixels respectively corresponding to one incidence angle in the predetermined range and to one wavelength in the second wavelength band.

For example, the irradiator 10 may collectively irradiate the irradiation light L1 having incidence angles θ1, θ2, θ3, θ4, θ5, θ6, and θ7 on the metal membrane M. For example, the second detector 29 may include an image sensor whose vertical axis corresponds to θ1, θ2, θ3, θ4, θ5, θ6, and θ7, and whose horizontal axis corresponds to the wavelength in the second wavelength band. For example, the controller 40 may select a row of pixels corresponding to the incidence angle of the irradiation light L1 that matches the resonance condition, as calculated based on the information on the first spectroscopic spectrum, and acquire the appropriate second spectroscopic spectrum. As described above, the spectroscopic analysis device 1 can also acquire the information on the second spectroscopic spectrum by collecting together angle information including the incidence angle.

By the detector 20 of the spectroscopic analysis device 1 including an image sensor as described above, and the spectroscopic analysis device 1 not including the first rotation mechanism 14 and the third rotation mechanism 24, the spectroscopic analysis device 1 can be reduced in size. Additionally, even when the refractive index of the sample S changes, there is no need to adjust the incidence angle of the irradiation light L1 to the optimum angle when acquiring the information on the second spectroscopic spectrum, thereby facilitating measurement.

The irradiator 10 has been described as including, for example, a single light source that irradiates the irradiation light L1 having a wavelength band that includes the visible and near-infrared regions, and detector 20 has been described as including the wavelength dispersion element 26 for dispersing the first measurement light L21 separated by the wavelength separation element 25, but this configuration is not limiting. For example, the irradiator 10 may include a first light source that irradiates a first irradiation light L11 having a wavelength band that is equal to or less than a full width at half maximum of the resonance spectrum of the surface plasmon in the first wavelength band, and a second light source that irradiates a second irradiation light L12 having the second wavelength band. For example, the first light source may include a light emitting diode (LED) or a laser diode (LD). At this time, the detector 20 need not include the wavelength dispersion element 26.

The first detector 27 may detect the first measurement light L21 separated by the wavelength separation element 25 while the light intensity of the first measurement light L21 is changed based on the resonance spectrum of the surface plasmon. For example, when the peak wavelength of the resonance spectrum of the surface plasmon in the first wavelength band and the center wavelength of the first irradiation light L11 irradiated from the first light source match, the amount of absorption of the first irradiation light L11 by the metal membrane M is maximized, and the light intensity of the first measurement light L21 in the first detector 27 is minimized. When the peak wavelength of the resonance spectrum of the surface plasmon shifts together with a change in the refractive index of the sample S, the optical intensity of the first measurement light L21 at the first detector 27 increases. Therefore, the controller 40 can also calculate the refractive index of the sample S by measuring the light intensity of the first measurement light L21 at the first detector 27.

The irradiator 10 has been described as including, for example, a single light source that irradiates the irradiation light L1 having a wavelength band that includes the visible and near-infrared regions, but this configuration is not limiting. For example, the irradiator 10 may include a first light source that irradiates a first irradiation light L11 having the first wavelength band and a second light source that irradiates a second irradiation light L12 having the second wavelength band. For example, the irradiator 10 may include a single light source capable of sweeping the center wavelength of the narrow-band irradiation light L1 from the visible region to the near-infrared region. For example, the irradiator 10 may include a first light source capable of sweeping the center wavelength of the narrow-band first irradiation light L11 in the visible region and a second light source capable of sweeping the center wavelength of the narrow-band second irradiation light L12 in the near-infrared region.

The wavelength dispersion element 26 and the first detector 27 have been described as being separate in the detector 20, but this configuration is not limiting. The detector 20 may include the first detector 27 as a single spectrometer in which these components are integrated, like the second detector 29. The detector 20 has been described as including the second detector 29 as a spectrometer that has a near-infrared spectroscopic element and a near-infrared detection element, but this configuration is not limiting. The near-infrared spectroscopic element and the near-infrared detection element may be separate in the detector 20.

The detector 20 has been described as including the wavelength separation element 25, the first detector 27, and the second detector 29, but this configuration is not limiting. For example, the detector 20 may include a single spectrometer capable of spectroscopy from the visible region to the near-infrared region, without including the wavelength separation element 25, the first detector 27, and the second detector 29.

The wavelength dispersion element 26 has been described as being an etalon filter, but this configuration is not limiting. For example, the wavelength dispersion element 26 may include a grating or may include a wavelength-variable bandpass filter that is capable of sweeping the center wavelength in the first wavelength band. At this time, the controller 40 may acquire the information on the spectroscopic spectrum as profile information. Based on the peak wavelength of the resonance spectrum in the visible region obtained after the refractive index of the sample S has changed, the controller 40 may calculate the refractive index of the sample S corresponding to the peak wavelength.

The first wavelength band has been described as being included in the visible region, and the second wavelength band as included in the near-infrared region, but this configuration is not limiting. The first wavelength band may be included in any wavelength band, in the spectroscopic spectrum, in which only the resonance spectrum of the surface plasmon in the metal membrane M occurs. The second wavelength band may be included in any wavelength band, in the spectroscopic spectrum, in which the resonance spectrum of the surface plasmon in the metal membrane M and the absorption spectrum of the sample S occur.

The metal membrane M has been described as being bonded to the prism substrate P, but this configuration is not limiting. For example, any membrane in which surface plasmon occur may be bonded to the prism substrate P.

REFERENCE SIGNS LIST

1 Spectroscopic analysis device
10 Irradiator
11 Wide band light source
12 Light guiding component
13 Optical parallelization component
14 First rotation mechanism (first adjustment mechanism)
20 Detector
21 Polarizer
22 Second rotation mechanism
23 Focusing component
24 Third rotation mechanism (second adjustment mechanism)
25 Wavelength separation element
26 Wavelength dispersion element
27 First detector
28 Light guiding component
29 Second detector
30 Memory
40 Controller
L1 Irradiation light
L11 First irradiation light
L12 Second irradiation light
L2 Measurement light
L21 First measurement light
L22 Second measurement light
M Metal membrane
P Prism substrate
S Sample
θ1, θ2, θ3, θ4, θ5, θ6, θ7 Incidence angle

The invention claimed is:

1. A spectroscopic analysis device for analyzing a state of a sample placed on a membrane that generates surface plasmon, the spectroscopic analysis device comprising:
a controller;
an irradiator configured to irradiate irradiation light on the membrane; and
a detector configured to detect measurement light including information on a spectroscopic spectrum that includes a resonance spectrum of the surface plasmon and an absorption spectrum of the sample, the measurement light being based on the irradiation light irradiated by the irradiator, wherein
the controller is configured to
acquire refractive index information on the sample based on information on a first spectroscopic spectrum in a first wavelength band in which only the resonance spectrum occurs within the spectroscopic spectrum,
determine, based on the acquired refractive index information, an incidence angle of the irradiation light irradiated by the irradiator with respect to the membrane such that a peak wavelength of the resonance spectrum and a peak wavelength of the absorption spectrum match in a second spectroscopic spectrum in a second wavelength band in which the resonance spectrum and the absorption spectrum occur within the spectroscopic spectrum, and
analyze the state of the sample from information on the second spectroscopic spectrum obtained based on the determined incidence angle.

2. The spectroscopic analysis device of claim 1, wherein the irradiator includes a first adjustment mechanism configured to adjust the incidence angle based on control by the controller, and
the detector includes a second adjustment mechanism configured to adjust a light-receiving angle to detect the measurement light at an exit angle corresponding to the incidence angle based on control by the controller.

3. The spectroscopic analysis device of claim 1, wherein the irradiator collectively irradiates the irradiation light that has the incidence angle in a predetermined range on the membrane, and
the detector includes an image sensor that has an array of a plurality of pixels respectively corresponding to one incidence angle in the predetermined range and to one wavelength in the second wavelength band.

4. The spectroscopic analysis device of claim 1, wherein the detector includes
a wavelength separation element configured to separate first measurement light that contains the information on the first spectroscopic spectrum and second measurement light that contains the information on the second spectroscopic spectrum from the measurement light, and
a first detector and a second detector respectively configured to detect the first measurement light and the second measurement light separated from each other by the wavelength separation element.

5. The spectroscopic analysis device of claim 4, wherein the detector is disposed between the wavelength separation element and the first detector and includes a wavelength dispersion element for dispersing the first measurement light separated by the wavelength separation element.

6. The spectroscopic analysis device of claim 5, wherein the wavelength dispersion element is an etalon filter.

7. The spectroscopic analysis device of claim 4, wherein
the irradiator includes a first light source configured to irradiate a first irradiation light having a wavelength band that is equal to or less than a full width at half maximum of the resonance spectrum in the first wavelength band, and a second light source configured to irradiate a second irradiation light having the second wavelength band, and
the first detector detects the first measurement light separated by the wavelength separation element while a light intensity of the first measurement light is changed based on the resonance spectrum.

8. The spectroscopic analysis device of claim 1, wherein the irradiator includes a single light source configured to irradiate the irradiation light having a wavelength band that includes the first wavelength band and the second wavelength band.

9. The spectroscopic analysis device of claim 1, wherein
the first wavelength band is included in a visible region, and
the second wavelength band is included in a near-infrared region.

10. A spectroscopic analysis method to be executed by a spectroscopic analysis device for analyzing a state of a sample placed on a membrane that generates surface plasmon, the spectroscopic analysis method comprising:
irradiating irradiation light on the membrane;
detecting measurement light including information on a spectroscopic spectrum that includes a resonance spectrum of the surface plasmon and an absorption spectrum of the sample, the measurement light being based on the irradiated irradiation light;
acquiring refractive index information on the sample based on information on a first spectroscopic spectrum in a first wavelength band in which only the resonance spectrum occurs within the spectroscopic spectrum;
determining, based on the acquired refractive index information, an incidence angle of the irradiation light irradiated by the irradiator with respect to the membrane such that a peak wavelength of the resonance spectrum and a peak wavelength of the absorption spectrum match in a second spectroscopic spectrum in a second wavelength band in which the resonance spectrum and the absorption spectrum occur within the spectroscopic spectrum; and
analyzing the state of the sample from information on the second spectroscopic spectrum obtained based on the determined incidence angle.

* * * * *